(12) United States Patent
Gopal et al.

(10) Patent No.: US 8,301,680 B2
(45) Date of Patent: Oct. 30, 2012

(54) APPARATUS AND METHOD TO COMPUTE RECIPROCAL APPROXIMATIONS

(75) Inventors: Vinodh Gopal, Westboro, MA (US); Gilbert M. Wolrich, Framingham, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 1270 days.

(21) Appl. No.: 11/963,833

(22) Filed: Dec. 23, 2007

(65) Prior Publication Data

US 2009/0164543 A1 Jun. 25, 2009

(51) Int. Cl.
*G06F 7/38* (2006.01)
*G06F 7/52* (2006.01)

(52) U.S. Cl. .......................... 708/502; 708/654
(58) Field of Classification Search .................. 708/502, 708/654

See application file for complete search history.

(56) References Cited

U.S. PATENT DOCUMENTS

| | | | | |
|---|---|---|---|---|
| 6,256,653 | B1 * | 7/2001 | Juffa et al. | 708/502 |
| 6,581,085 | B1 * | 6/2003 | Yue et al. | 708/502 |
| 6,769,006 | B2 * | 7/2004 | Krouglov et al. | 708/502 |
| 6,782,405 | B1 * | 8/2004 | Matula et al. | 708/654 |
| 7,191,204 | B1 * | 3/2007 | Ogata | 708/654 |
| 2001/0027461 | A1 * | 10/2001 | Peterson | 708/654 |
| 2006/0277240 | A1 * | 12/2006 | Choo et al. | 708/502 |

OTHER PUBLICATIONS

Intel Corporation, "Intel IA-64 Architecture Software Developer's Manual", Jan. 2000, vol. 3: Instruction Set Reference, 926 pages.

* cited by examiner

*Primary Examiner* — Tan V. Mai
(74) *Attorney, Agent, or Firm* — Grossman, Tucker, Perreault & Pfleger, PLLC (57) ABSTRACT

A method and apparatus for reducing memory required to store reciprocal approximations as specified in Institute of Electrical and Electronic Engineers (IEEE) standards such as IEEE 754 is presented. Monotonic properties of the reciprocal function are used to bound groups of values. Efficient bit-vectors are used to represent information in groups resulting in a very compact table representation about four times smaller than storing all of the reciprocal approximations in a table.

20 Claims, 6 Drawing Sheets

|  104-1 | 104-2 | 104-3 | 104-4 | 104-5 | 104-6 | 104-7 | 104-8 |
|---|---|---|---|---|---|---|---|
| 0x3fc | 0x3f4 | 0x3ec | 0x3e4 | 0x3dd | 0x3d5 | 0x3cd | 0x3c6 |
| 0x3be | 0x3b7 | 0x3af | 0x3a8 | 0x3a1 | 0x399 | 0x392 | 0x38b |
| 0x384 | 0x37d | 0x376 | 0x36f | 0x368 | 0x361 | 0x35b | 0x354 |
| 0x34d | 0x346 | 0x340 | 0x339 | 0x333 | 0x32c | 0x326 | 0x320 |
| 0x319 | 0x313 | 0x30d | 0x307 | 0x300 | 0x2fa | 0x2f4 | 0x2ee |
| 0x2e8 | 0x2e2 | 0x2dc | 0x2d7 | 0x2d1 | 0x2cb | 0x2c5 | 0x2bf |
| 0x2ba | 0x2b4 | 0x2af | 0x2a9 | 0x2a3 | 0x29e | 0x299 | 0x293 |
| 0x28e | 0x288 | 0x283 | 0x27e | 0x279 | 0x273 | 0x26e | 0x269 |
| 0x264 | 0x25f | 0x25a | 0x255 | 0x250 | 0x24b | 0x246 | 0x241 |
| 0x23c | 0x237 | 0x232 | 0x22e | 0x229 | 0x224 | 0x21f | 0x21b |
| 0x216 | 0x211 | 0x20d | 0x208 | 0x204 | 0x1ff | 0x1fb | 0x1f6 |
| 0x1f2 | 0x1ed | 0x1e9 | 0x1e5 | 0x1e0 | 0x1dc | 0x1d8 | 0x1d4 |
| 0x1cf | 0x1cb | 0x1c7 | 0x1c3 | 0x1bf | 0x1bb | 0x1b6 | 0x1b2 |
| 0x1ae | 0x1aa | 0x1a6 | 0x1a2 | 0x19e | 0x19a | 0x197 | 0x193 |
| 0x18f | 0x18b | 0x187 | 0x183 | 0x17f | 0x17c | 0x178 | 0x174 |
| 0x171 | 0x16d | 0x169 | 0x166 | 0x162 | 0x15e | 0x15b | 0x157 |
| 0x154 | 0x150 | 0x14d | 0x149 | 0x146 | 0x142 | 0x13f | 0x13b |
| 0x138 | 0x134 | 0x131 | 0x12e | 0x12a | 0x127 | 0x124 | 0x120 |
| 0x11d | 0x11a | 0x117 | 0x113 | 0x110 | 0x10d | 0x10a | 0x107 |
| 0x103 | 0x100 | 0x0fd | 0x0fa | 0x0f7 | 0x0f4 | 0x0f1 | 0x0ee |
| 0x0eb | 0x0e8 | 0x0e5 | 0x0e2 | 0x0df | 0x0dc | 0x0d9 | 0x0d6 |
| 0x0d3 | 0x0d0 | 0x0cd | 0x0ca | 0x0c8 | 0x0c5 | 0x0c2 | 0x0bf |
| 0x0bc | 0x0b9 | 0x0b7 | 0x0b4 | 0x0b1 | 0x0ae | 0x0ac | 0x0a9 |
| 0x0a6 | 0x0a4 | 0x0a1 | 0x09e | 0x09c | 0x099 | 0x096 | 0x094 |
| 0x091 | 0x08e | 0x08c | 0x089 | 0x087 | 0x084 | 0x082 | 0x07f |
| 0x07c | 0x07a | 0x077 | 0x075 | 0x073 | 0x070 | 0x06e | 0x06b |
| 0x069 | 0x066 | 0x064 | 0x061 | 0x05f | 0x05d | 0x05a | 0x058 |
| 0x056 | 0x053 | 0x051 | 0x04f | 0x04c | 0x04a | 0x048 | 0x045 |
| 0x043 | 0x041 | 0x03f | 0x03c | 0x03a | 0x038 | 0x036 | 0x033 |
| 0x031 | 0x02f | 0x02d | 0x02b | 0x029 | 0x026 | 0x024 | 0x022 |
| 0x020 | 0x01e | 0x01c | 0x01a | 0x018 | 0x015 | 0x013 | 0x011 |
| 0x00f | 0x00d | 0x00b | 0x009 | 0x007 | 0x005 | 0x003 | 0x001 |

FIG. 1

|  |  |  |  |
|---|---|---|---|
| 7 | 0x9 | 0x3c6 | 202-1 |
| 7 | 0x5b | 0x38b | |
| 6 | 0x7d | 0x354 | |
| 6 | 0x54 | 0x320 | |
| 6 | 0x8 | 0x2ee | |
| 5 | 0x10 | 0x2bf | |
| 5 | 0x26 | 0x293 | |
| 5 | 0x3b | 0x269 | |
| 5 | 0x7f | 0x241 | |
| 4 | 0x6e | 0x21b | |
| 4 | 0x55 | 0x1f6 | |
| 4 | 0x48 | 0x1d4 | |
| 4 | 0x2 | 0x1b2 | |
| 3 | 0x2 | 0x193 | |
| 3 | 0x4 | 0x174 | |
| 3 | 0x12 | 0x157 | |
| 3 | 0x2a | 0x13b | |
| 3 | 0x36 | 0x120 | |
| 3 | 0x6f | 0x107 | |
| 3 | 0x7f | 0xee | |
| 3 | 0x7f | 0xd6 | |
| 2 | 0x77 | 0xbf | |
| 2 | 0x5d | 0xa9 | |
| 2 | 0x36 | 0x94 | |
| 2 | 0x55 | 0x7f | |
| 2 | 0x25 | 0x6b | |
| 2 | 0x52 | 0x58 | |
| 2 | 0x49 | 0x45 | |
| 2 | 0x11 | 0x33 | |
| 2 | 0x4 | 0x22 | |
| 2 | 0x4 | 0x11 | |
| 2 | 0x0 | 0x1 | 202-32 |

Columns: 204-1, 204-2, 204-3 (table 200)

FIG. 6

APPARATUS AND METHOD TO COMPUTE RECIPROCAL APPROXIMATIONS

FIELD

This disclosure relates to methods and apparatus for performing arithmetic operations in a computer system and in particular to binary floating point arithmetic.

BACKGROUND

A floating-point number is represented as a concatenation of a sign bit, an M-bit exponent field and an N-bit significand field. The IEEE standard for Binary Floating-Point Arithmetic (IEEE-754) defines formats for representing floating point numbers including single precision (M=8; N=24); double precision (M=11; N=53) and double-extended precision (M=15; N=64) formats.

Division of floating point numbers (a/b) is performed using reciprocal approximation by first obtaining a reciprocal approximation of 1/b and refining the reciprocal approximation by a series of subsequent multiplication and subtraction operations. In many processor architectures, ten bit reciprocal approximations of 1/b are pre-computed and stored in a lookup table having 265 entries that is indexed by the eight Most Significant Bits (MSBs) of the operand 'b' treated as a normalized real number in binary of the form 1.xx . . . x that is defined by IEEE-754 standard. The lookup table storing the 256 reciprocal approximations may be implemented in specialized logic as a Programmable Logic Array (PLA).

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 1 illustrates reciprocal approximations stored in a 256 entry lookup table that may be used to perform division of binary floating point numbers;

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A lookup in the PLA based lookup table for a reciprocal approximation is typically performed in about one cycle. However, the PLA based lookup table requires 256×10 bits (2560 bits) of memory to store all of the reciprocal approximations which consumes power in addition to the amount of memory needed.

An embodiment of the present invention reduces the amount of memory needed to store the reciprocal approximations without changing the performance. In an embodiment the memory is about four times smaller than typically used by prior art lookup tables.

FIG. 1 illustrates reciprocal approximations stored in a 256 entry lookup table 100 that may be used to perform division of binary floating point numbers. For example, the 256 fixed 10-bit values (in hexadecimal) that are stored in a PLA based lookup table used in Intel IA-64 Architecture processors are shown in the lookup table 100 in FIG. 1 and also in the "Intel IA-64 Architecture Software Developer's Manual, Volume 3: Instruction Set Reference, January 2000".

The entries in the lookup table 100 are arranged in row-major form with eight entries per row and a total of 32 rows 102_1, . . . , 102_32. The values (in hexadecimal format) stored in the 256 entries 104_1, . . . , 104_256 are reciprocal approximations for 1/b where b is in the range of 1.00000000 to 1.11111111. The reciprocal approximation of 1.00000000 (0x3FC) is stored in entry 104_1 and the reciprocal approximation of 1.11111111 (0x001) is stored in entry 104_256. With 10-bits per entry and 256 entries in the lookup table, a PLA with an area proportional to 2560 units (256*10 bits) is required to store all of the reciprocal approximations.

Looking at the values of the reciprocal approximations stored in the 256 entries 104_1 . . . 104_256 in the table 100 in FIG. 1, the values are monotonic in nature and the difference between any two successive values is small. The difference between any two successive values is not greater than eight and not less than two. Also, when moving from the value stored in entry 104_1 to the value stored in entry 104_256, the differences between the values stored in any two successive entries 104_1, . . . , 104_256 decreases.

For example, looking at the values stored in entries in the first row 102_1: entry 104_8 stores a value of 0x3c6, moving across the entries in the row from left to right, the value stored in entry 104_7 is 0x3cd, which is 0x3c6−7 (a difference of 7), the value stored in entry 104_6 is 0x3d5 which is 0x3cd−8 (a difference of 8). Similarly, continuing across the first row 102_1, the difference been any two values stored in successive entries in the first row 102_1 is either 7 or 8.

A pattern may also be observed between values stored in successive entries in other rows in the lookup table 100. For example, looking at the values stored in row 102_3, that is, 0x384, 0x37d, 0x376, 0x36f, 0x368, 0x361, 0x35b, 0x354, the difference between values stored in two successive entries in the third row 102_3 is either 6 or 7.

Looking at the values stored in row 102_6, that is, 0x2e8, 0>2e2, 0x2dc, 0x2d7, 0x2d1, 0x2cb, 0x2c5, 0x2bf, the difference between values stored in successive entries in the sixth row is either 5 or 6. Looking at the values stored in row 102_31, that is, 0x020, 0x01e, 0x01c, 0x01a, 0x018, 0x015, 0x013, 0x011, the difference between values stored in two successive entries in the thirty first row is either 2 or 3.

Thus, the difference between values stored in two successive entries in any one of the rows 102-1, . . . 102-32 in the lookup table 100 is always n or n+1 where n is in the range of 2-7. Thus, instead of storing all 256 reciprocal approximations in lookup table 100, the amount of memory may be reduced by encoding the reciprocal approximations for a row (that is, a group of reciprocal approximations) as a representation of a group of reciprocal approximations (an encoded group of reciprocal approximations) from which any of the reciprocal approximations in the group may be computed.

Figure 2:
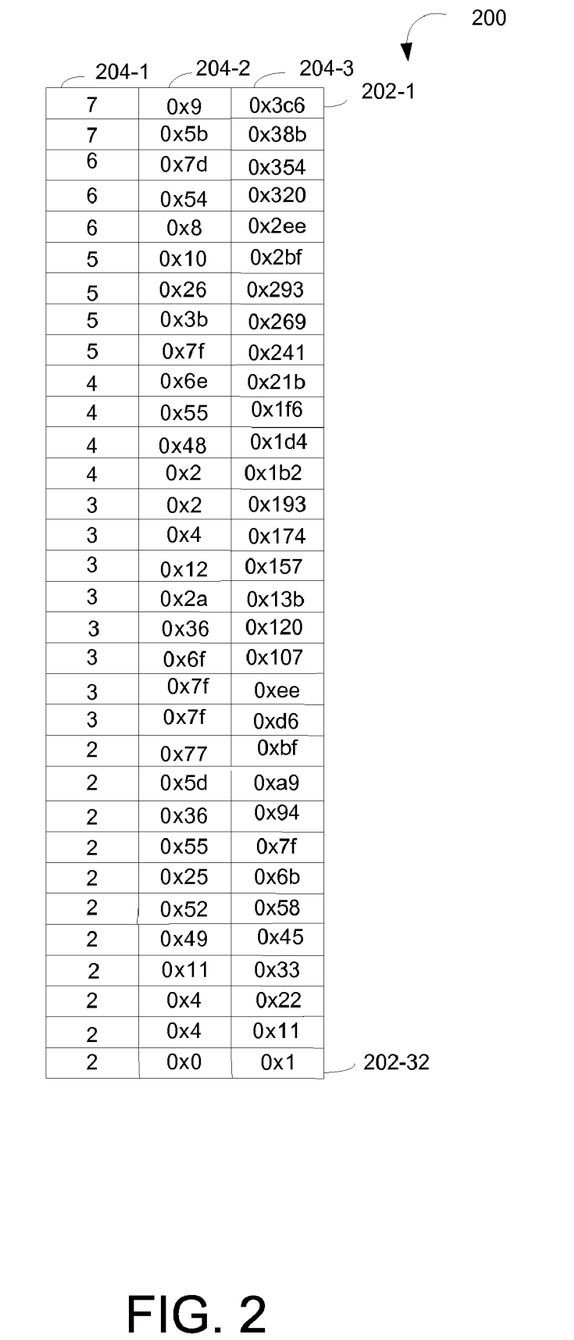
FIG. 2 illustrates a plurality of representations of groups of reciprocal approximations from which the reciprocal approximations shown in FIG. 1 may be computed.

FIG. 2 illustrates a plurality of representations of groups of reciprocal approximations from which the reciprocal approximations shown in FIG. 1 may be computed. The plurality of representations of groups of reciprocal approximations may be stored in a lookup table 200. Each representation of a group of reciprocal approximations 202-1, ..., 202-32 includes a base reciprocal approximation 204-3 for the group 202-1, ..., 202-32. In an embodiment, the base reciprocal approximation 204-3 is the reciprocal approximation for the reciprocal approximation having the smallest value that is stored in the group (row). In an embodiment in which the group corresponds to a row 102-1, ... 102-32 in the lookup table 100 shown in FIG. 1, the base reciprocal approximation for row 102-1 is the reciprocal approximation stored in entry 104-8, that is, 0x3c6, which is stored in group of reciprocal approximations 202-1.

In order to generate any of the eight reciprocal approximations for any of the rows 102-1, ..., 102-32 in the table 100 shown in FIG. 1, each representation of a group of reciprocal approximations 202-1, ..., 202-32 includes a minimum-value of the difference between reciprocal approximations stored in successive entries in the group (row) (n) 204-1. The representation of a group of reciprocal approximations 202-1, ..., 202-32 also includes a bit mask vector 204-2 having single bit per reciprocal approximation for all reciprocal approximations other than the base reciprocal approximation in the group. The state of a bit in the bit mask vector 204-2 that corresponds to the reciprocal approximation in the group indicates whether to add the minimum difference 204-1 or the minimum difference plus one to the base reciprocal approximation 204-3 to compute the reciprocal approximation for the entry in the group.

In an embodiment, the representation of a group of reciprocal approximations requires memory storage that is about four times smaller than the lookup table 100 discussed in conjunction with FIG. 1 that stores all possible 256 reciprocal approximations. In the embodiment shown, instead of storing all 256 reciprocal approximations in 2560 bits, the 256 reciprocal approximations are encoded in 32 representations of groups of reciprocal approximations 202-1, ..., 202-31 with each representation of a group of reciprocal approximations having 20 bits for a total of 640 bits. In an embodiment, additional logic to compute the reciprocal approximation corresponding to an index uses about 15 gates which occupy an insignificant area in comparison to the additional amount of memory required to store all of the reciprocal approximations as discussed in conjunction with FIG. 1.

Figure 3:
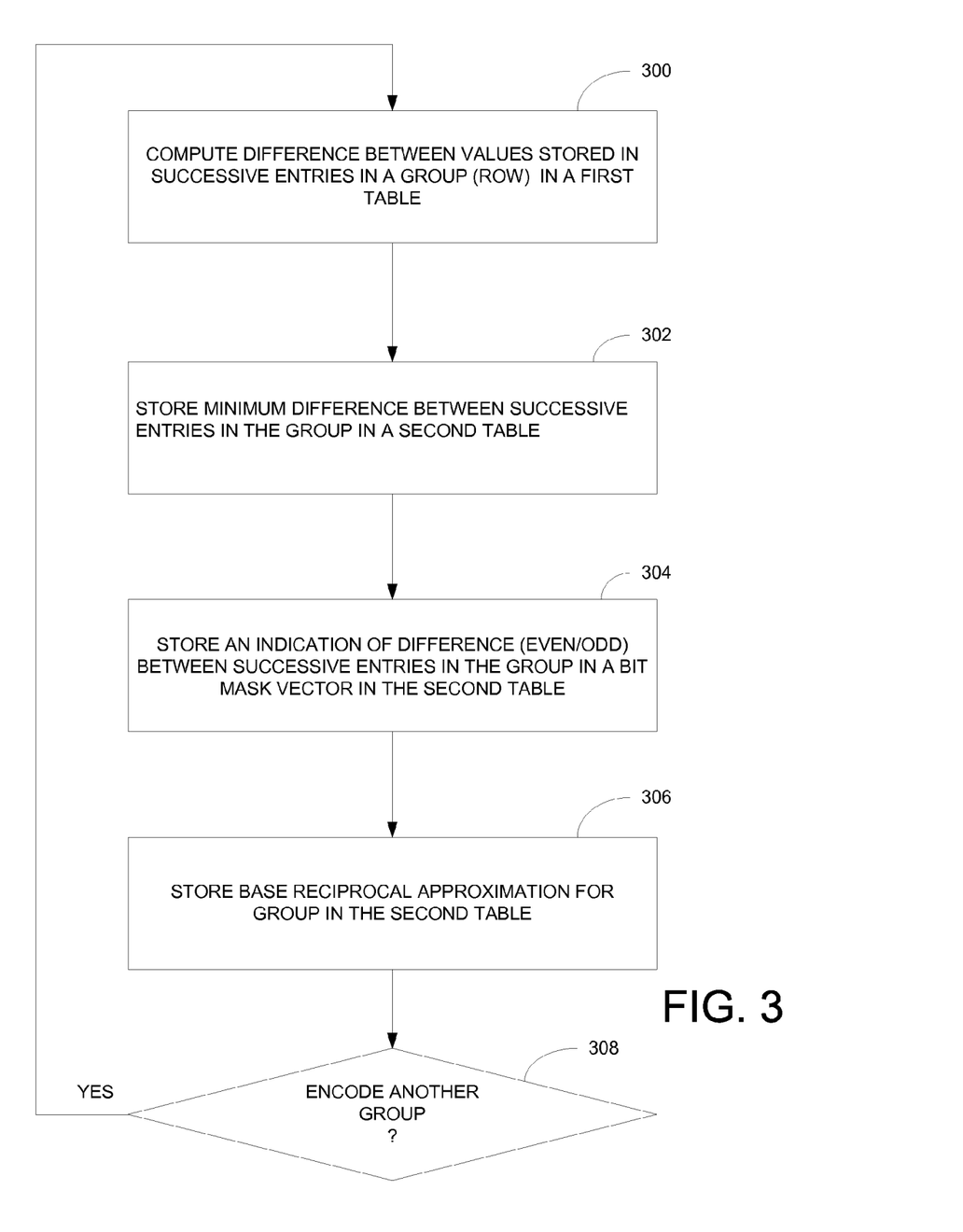
FIG. 3 is a flowgraph illustrating an embodiment of a method for storing reciprocal approximations shown in FIG. 1 as the plurality of representations of groups of reciprocal approximations shown in FIG. 2.

FIG. 3 is a flowgraph illustrating an embodiment of a method for storing the reciprocal approximations shown in FIG. 1 as the plurality of representations of groups of reciprocal approximations shown in FIG. 2.

At block 300, the differences between successive reciprocal approximations in a group of reciprocal approximations is computed. In one embodiment the number of reciprocal approximations in a group is eight, which is the same number of reciprocal approximations that are stored per row 102-1, ..., 102-32 in the lookup table 100 shown in FIG. 1. Processing continues with block 302.

At block 302, the minimum difference between successive reciprocal approximations in the group (row) is stored in a minimum difference field 204-1 in table 200. For example, as the difference between successive reciprocal approximations in row 102-1 of table 100 is either 7 or 8, the minimum difference, that is, 7 is stored in the minimum difference field 204-1 in representation of reciprocal approximations 202-1. Processing continues with block 304.

At block 304, an indication of whether the difference between successive reciprocal approximations in the group of reciprocal approximations is even or odd is stored in a bit mask 204-2. For example, referring to FIG. 1, looking from left to right at the reciprocal approximations in row 102-1, the differences are 8, 8, 8, 7, 8, 8, 7 which corresponds to even, even, even, odd, even, even, even, odd. Substituting '1' for odd and '0' for even, the bit mask is 0001001 (0x9) which is stored in the bit mask field 204-1 in the representation of reciprocal approximations 202-1. Processing continues with block 306.

At block 306, the reciprocal approximation that is stored in entry 104-8 that is, the entry for which the Least Significant Bits of an index are '111' is selected as the base reciprocal approximation and stored in the base reciprocal approximation field 204-3 in the representation of reciprocal approximations 202-1. In other embodiments, other reciprocal approximations in the group may be selected as the base reciprocal approximation with appropriate selection of the bit mask vector so that any of the reciprocal approximations in the group may be computed using the base reciprocal approximation. For example, in an embodiment, the reciprocal approximation that is stored in entry 104-1, that is, the entry for which the Least Significant Bits of an index are '000' may be selected as the base reciprocal approximation. Processing continues with block 308.

At block 308, if there is another group of reciprocal approximations in table 100 to be encoded into a representation of reciprocal approximations, processing continues with block 300. If not, processing is complete.

Figure 4:
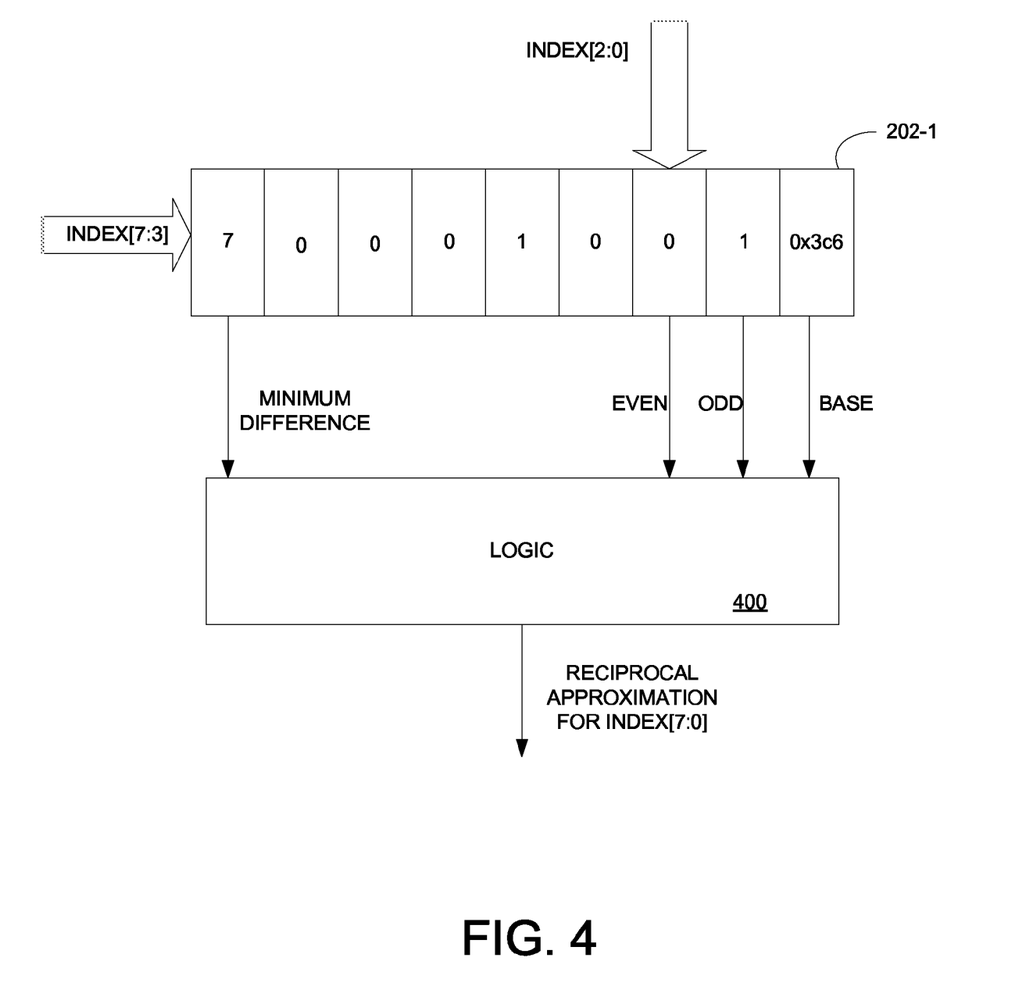
FIG. 4 is a block diagram illustrating computation of a reciprocal approximation for an index using the representation of reciprocal approximations associated with the index.

FIG. 4 is a block diagram illustrating computation of a reciprocal approximation for an index using the representation of a group of reciprocal approximations associated with the index. In an embodiment with 256 reciprocal approximations, an 8-bit index (index[7:0]) is used to select one of the reciprocal approximations.

The five Most Significant Bits (MSB) of the index are used to select the representation of a group of reciprocal approximations, in this example, the 5 MSBs of the index set to '00000' selects the representation of a group of reciprocal approximations 202-1. The three Least Significant Bits (LSB) are used to select bits from the bit mask vector, in this case, the three LSBs set to '101'.

Referring to FIG. 1, row 102-1 stores reciprocal approximations for 1.00000000 to 1.00000111. 1.0000000 and, 1.00000111 are significands or mantissas having a one leading digit of 1 and fractional digits 00000100, 00000111 The reciprocal approximation for 1.00000000, that is, 0x3df is stored in entry 104-1 and the reciprocal approximation for 1.00000111, that is, 0x3c6 is stored in entry 104-8.

Returning to FIG. 4, the representation of reciprocal approximations 202-1 represents reciprocal approximations for 1.000000000 to 1.00000111, with the five MSBs of the fractional digits of the significand (00000) selecting representation of reciprocal approximations 202-1.

Figure 5:
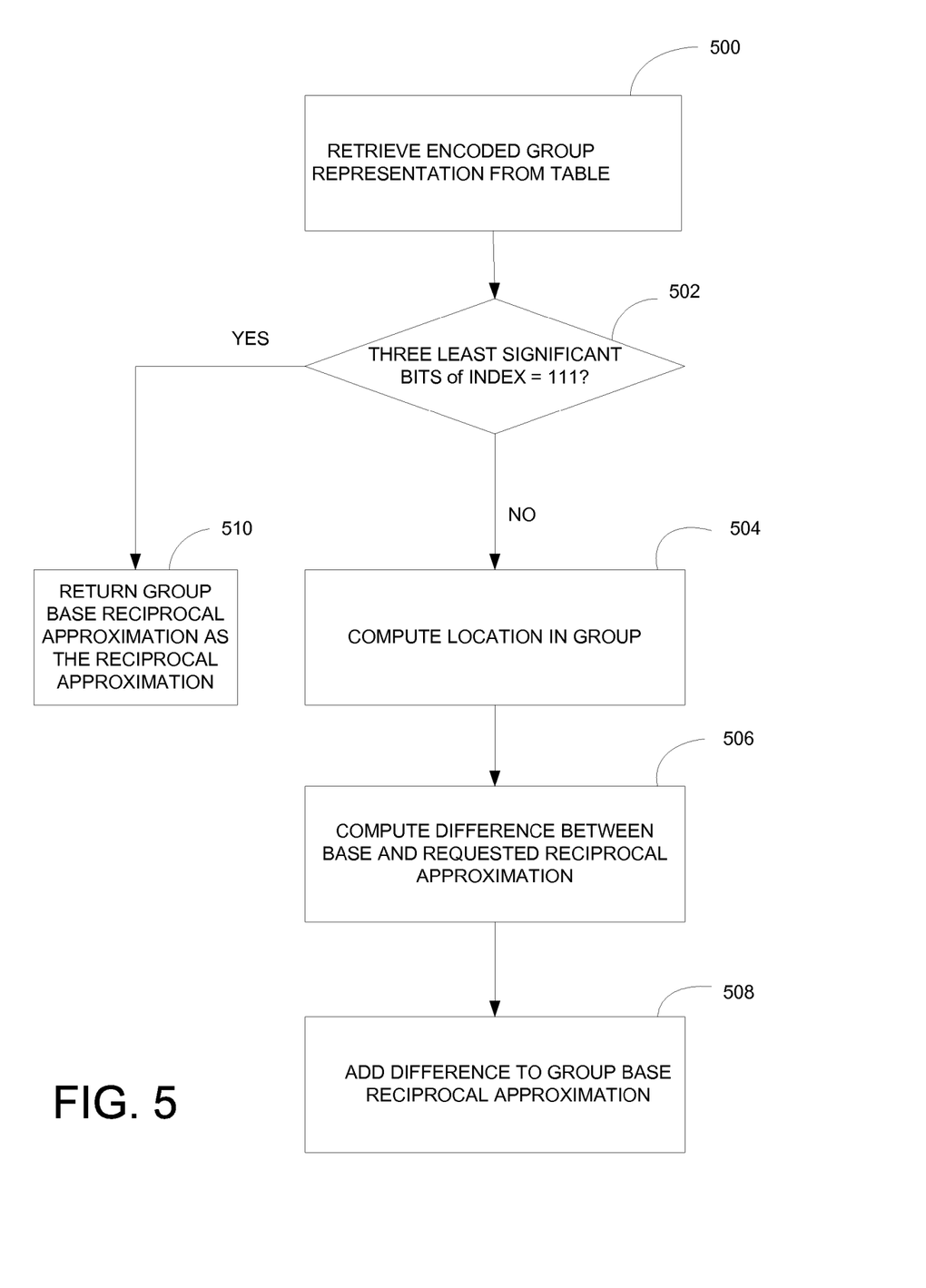
FIG. 5 is a flowgraph illustrating an embodiment of a method for computing a reciprocal approximation from a representation of a group of reciprocal approximations.

FIG. 5 is a flowgraph illustrating an embodiment of a method for computing a reciprocal approximation corresponding to an index from a representation of reciprocal approximations. FIG. 5 will be described in conjunction with FIGS. 1, 2 and 4.

At block 500, in an embodiment in which there are 32 encoded representations of groups of reciprocal approximations stored in a table, the five Most Significant bits of the eight fractional digits of the significand are used as an index to the table to select one of the 32 representations of groups of reciprocal approximations. The representation of reciprocal approximations 202-1 is selected for index[7:3] of '00000'. Processing continues with block 502.

At block 502, if the three Least Significant bits (LSB) of the 8 fractional digits of the significand index[2:0] are '111', the base corresponds to the reciprocal approximation and processing continues with block 510. If not, processing continues with block 504, to determine the location of the requested reciprocal approximation.

At block 504, the representation of a group of reciprocal approximations includes a minimum difference 204-1, a mask bit vector 204-2 and a base 204-3. Referring to FIG. 2, in the representation of a group of reciprocal approximations 202-1 that corresponds to the index which is a mantissa or significand of a floating point number, for example, 1.000000101, the 3-bit minimum difference 204-1 is 0x7, the 7-bit mask bit vector is 0x9 (0001001) and the 10-bit base reciprocal approximation is 0x3c6. First, the number of bits of the mask to process (that is, the column location of the reciprocal approximation in the table shown in FIG. 1) is determined by subtracting the three least significant fractional digits (index[2:0] of the significand from the minimum difference 204-1, that is, in base 2, 111-101 (0x7−0x5). The result is 010 (0x2). Processing continues with block 506.

At block 506, in this case, the minimum difference (n) is 7, an odd number and n+1 is 8, an even number. Thus, the odd difference value is 7 and the even difference value is 8. The mask bit vector 204-2 is 0x9 (1001 in base 2). Based on the result (0x2), the two least significant bits of the mask bit vector which store '01' are used to compute the reciprocal approximation. The bits of the mask bit register indicate whether the even difference value (8) or the odd difference value (7) are added to the base reciprocal approximation to compute the reciprocal approximation with '1' indicating odd and '0' indicating even. The sum of the odd difference value (0x7) and the even difference value (0x8) is 15 (0xf). Processing continues with block 508.

At block 508, the sum of the difference values (0xf) is added to the base reciprocal approximation 0x3c6. The result is 0x3d5 which corresponds to the reciprocal approximation stored in entry 104-6 in table 100 in FIG. 1.

In an embodiment, the computation of the difference between the reciprocal approximation and the base may be performed by Carry Save Adders (CSAs).

An embodiment has been described for a table with 32 20-bit entries storing the representation of the group of reciprocal approximations for a group of 8 reciprocal approximations, with the base approximation reciprocal having the smallest reciprocal approximation in the group. In another embodiment, the table may have 64 16-bit entries storing the representation of the group of reciprocal approximations for a group of 4 reciprocal approximations. In this embodiment, a 1024-bit table is required to store the 64 entries each having a 10-bit base reciprocal approximation has 10-bits, a 3-bit minimum difference has 3-bits and a 3-bit mask vector. In contrast to the embodiment for a 32 entry table, the critical path for the 64 entry table is a little faster and the 1024-bit table provides about a fifty percent area reduction over the 2560 bit PLA based lookup table.

In an embodiment, the table 200 is included in an Arithmetic Logical Unit in a processor for use by division algorithms. In other embodiments, the table 200 is included in a floating point unit in a processor for performing floating point division operations.

An embodiment has been described for providing a representation of a group of reciprocal approximations by moving across entries in a row in a PLA based lookup table from left to right. In another embodiment, the representation of a group of reciprocal approximations may be provided by moving across entries in a row from right to left.

Figure 6:
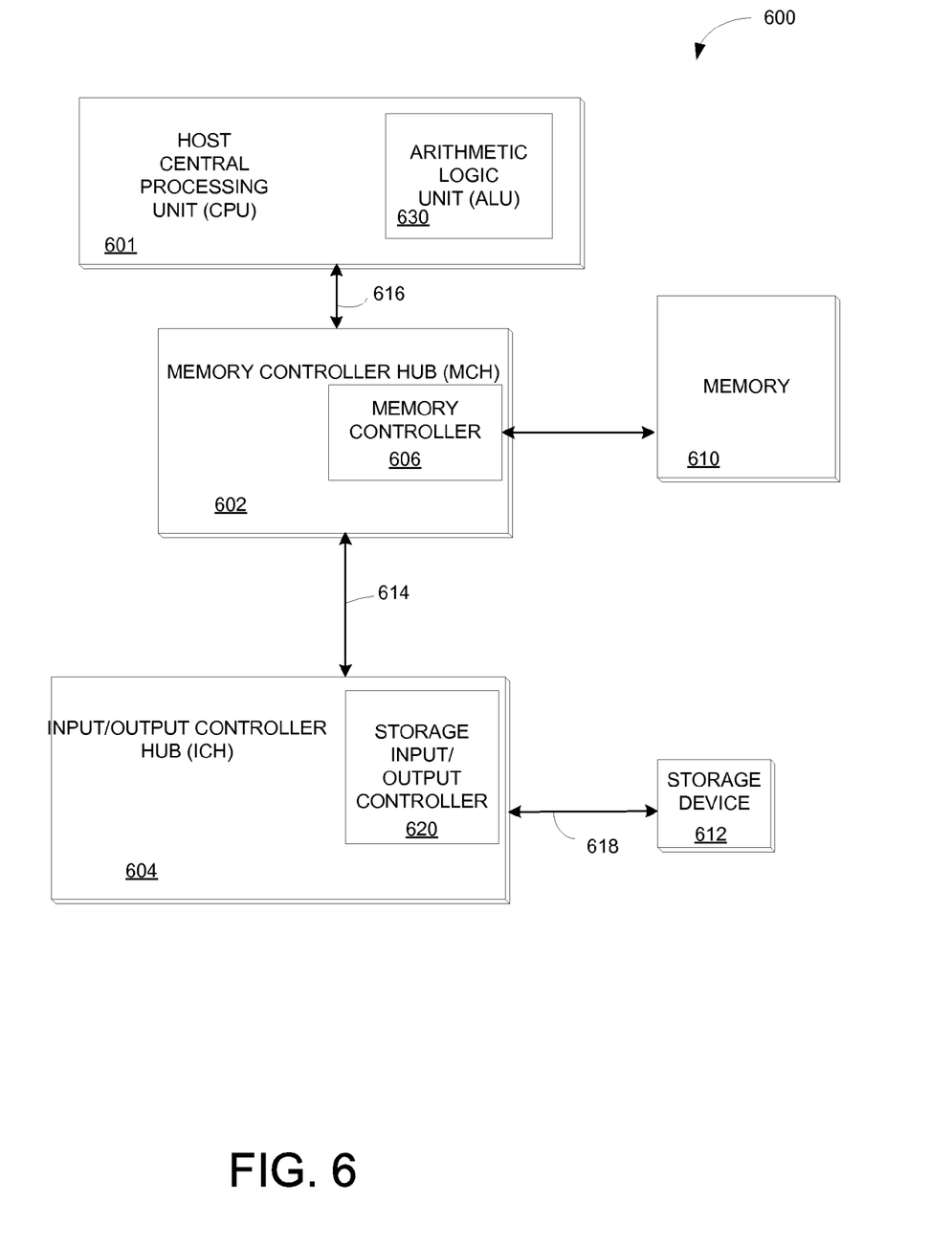
FIG. 6 is a block diagram of a system that includes an embodiment of an Arithmetic Logic Unit (ALU) in a processor to compute a reciprocal approximation corresponding to a selected one of the representations of a group of reciprocal approximations.

FIG. 6 is a block diagram of a system 100 that includes an embodiment of an Arithmetic Logic Unit (ALU) 630 in a processor to compute a reciprocal approximation corresponding to a selected one of the representations of a group of reciprocal approximations. In an embodiment the ALU 630 includes a plurality of groups of representations of reciprocal approximations 200 as discussed in conjunction with FIG. 2 and logic 400 for computing a reciprocal approximation as discussed in conjunction with FIG. 4.

The system 100 includes a processor 301 that includes an ALU 630, a Memory Controller Hub (MCH) 602 and an Input/Output (I/O) Controller Hub (ICH) 604. The MCH 602 includes a memory controller 306 that controls communication between the processor 301 and memory 610. The processor 601 and MCH 602 communicate over a system bus 616.

The processor 601 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 610 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 604 may be coupled to the MCH 602 using a high speed chip-to-chip interconnect 614 such as Direct Media Interface (DMI). DMI supports 2 Gigabit/second concurrent transfer rates via two unidirectional lanes.

The ICH 604 may include a storage I/O controller 620 for controlling communication with at least one storage device 612 coupled to the ICH 604. The storage device 612 may be, for example, a disk drive, Digital Video Disk (DVD) drive, Compact Disk (CD) drive, Redundant Array of Independent Disks (RAID), tape drive or other storage device. The ICH 604 may communicate with the storage device 612 over a storage protocol interconnect 618 using a serial storage protocol such as, Serial Attached Small Computer System Interface (SAS) or Serial Advanced Technology Attachment (SATA).

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
  memory to store a plurality of encoded groups of reciprocal approximations; and
  logic coupled to the memory to select one of the encoded groups based on a first portion of an index and using the selected encoded group and a second portion of the index to compute a reciprocal approximation corresponding to the index;

wherein the encoded group includes a minimum difference between successive reciprocal approximations in the encoded group, a bit mask vector and a base reciprocal approximation.

2. The apparatus of claim 1, wherein the base reciprocal approximation is the reciprocal approximation associated with the largest index associated with the encoded group.

3. The apparatus of claim 1, wherein the minimum difference is in the range of 2 to 7.

4. The apparatus of claim 1, wherein each encoded group has 20 bits to encode 8 reciprocal approximations.

5. The apparatus of claim 1, wherein the index includes fractional digits of a significand of a floating point number.

6. The apparatus of claim 1, wherein each encoded group has 16 bits to encode 4 reciprocal approximations.

7. A method comprising:
storing a plurality of encoded groups of reciprocal approximations in computer readable memory;
selecting one of the encoded groups, using a processor coupled to said computer readable memory, based on a first portion of an index; and
computing, using said processor, a reciprocal approximation corresponding to the index using the selected encoded group and a second portion of the index;
wherein the encoded group includes a minimum difference between successive reciprocal approximations in the encoded group, a bit mask vector and a base reciprocal approximation.

8. The method of claim 7, wherein the base reciprocal approximation is the reciprocal approximation associated with the largest index associated with the encoded group.

9. The method of claim 7, wherein the minimum difference is in the range of 2 to 7.

10. The method of claim 7, wherein each encoded group has 20 bits to encode 8 reciprocal approximations.

11. The method of claim 7, wherein the index includes fractional digits of a significand of a floating point number.

12. The method of claim 7, wherein each encoded group has 16 bits to encode 4 reciprocal approximations.

13. An article including a computer readable memory having associated information, wherein the information, when accessed, results in a processor performing:
storing a plurality of encoded groups of reciprocal approximations in computer readable storage memory;
selecting one of the encoded groups based on a first portion of an index and using the selected encoded group and a second portion of the index to compute a reciprocal approximation corresponding to the index;
wherein the encoded group includes a minimum difference between successive reciprocal approximations in the encoded group, a bit mask vector and a base reciprocal approximation.

14. The article of claim 13 wherein the base reciprocal approximation is the reciprocal approximation associated with the largest index associated with the encoded group.

15. The article of claim 13, wherein the minimum difference is in the range of 2 to 7.

16. The article of claim 13, wherein each encoded group has 20 bits to encode 8 reciprocal approximations.

17. A system comprising:
a dynamic random access memory; and
a processor coupled to the dynamic random access memory, the processor including an arithmetic logic unit, the arithmetic logic unit comprising:
memory to store a plurality of encoded groups of reciprocal approximations; and
logic coupled to the memory to select one of the encoded groups based on a first portion of an index and using the selected encoded group and a second portion of the index to compute a reciprocal approximation corresponding to the index;
wherein the encoded group includes a minimum difference between successive reciprocal approximations in the encoded group, a bit mask vector and a base reciprocal approximation.

18. The system of claim 17, wherein the base reciprocal approximation is the reciprocal approximation associated with the largest index associated with the encoded group.

19. The system of claim 17, wherein the minimum difference is in the range of 2 to 7.

20. The system of claim 17, wherein each encoded group has 20 bits to encode 8 reciprocal approximations.

* * * * *